June 24, 1941.  L. W. FOSTER  2,247,332
CONTROL OF ELECTRIC POWER SYSTEMS
Filed Dec. 3, 1940
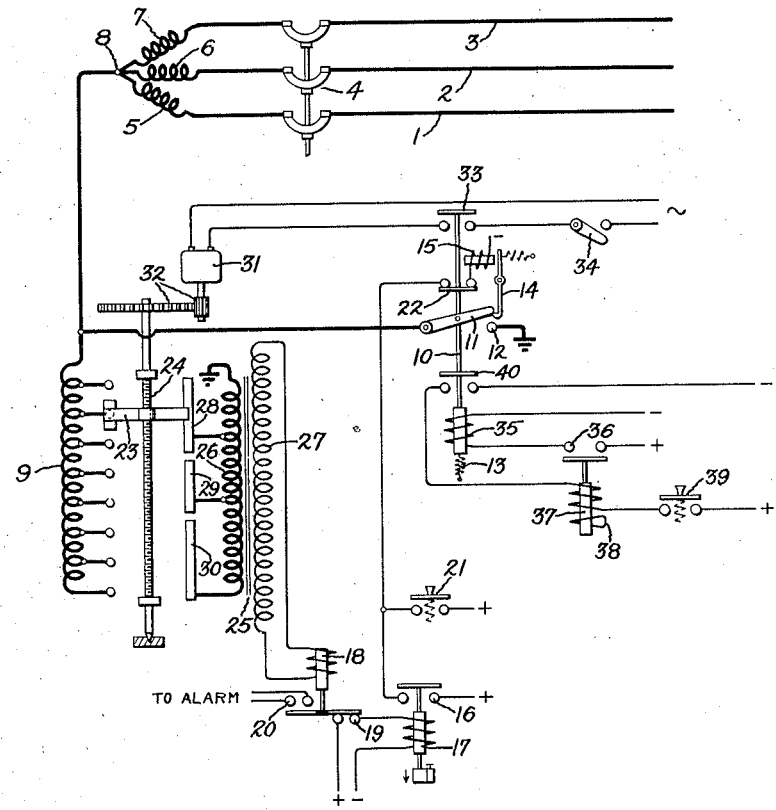
Inventor:
Levin W. Foster,
by Harry E. Dunham
His Attorney.

Patented June 24, 1941

2,247,332

UNITED STATES PATENT OFFICE 2,247,332

CONTROL OF ELECTRIC POWER SYSTEMS

Levin W. Foster, Pittsfield, Mass., assignor to General Electric Company, a corporation of New York Application December 3, 1940, Serial No. 368,360

7 Claims. (Cl. 171—97)

My invention relates to improvements in the control of electric power systems and especially systems of the type wherein a fault to ground on a phase conductor of the system substantially increases the capacitance current to ground of the ungrounded phase conductors of the system. More particularly, my invention relates to improvements in the control of inductive reactance devices and transformers energized in dependance on the current flowing in such devices and especially to the control of ground-fault neutralizers and current transformers energized therefrom for use in electric power systems as disclosed in United States Letters Patent 1,378,557.

A large percentage of the faults on alternating current electric systems involve, initially at least, only a single conductor to ground. Most of these are of a transient or arcing character. It is, therefore, desirable whenever possible, to clear such faults without circuit breaker operations. Such arcing ground faults may be cleared by arc suppressing or ground fault neutralizing apparatus of the type disclosed in United States Letters Patent No. 1,537,371, issued May 12, 1925. Such apparatus by itself is effective only on alternating current electric systems of the type wherein a fault to ground on a phase conductor of the system substantially increases the capacitance current to ground of the ungrounded phase conductors of the system. Moreover, since the capacitance to ground of the phase conductors of such systems varies materially with the amount of system in service, it is necessary to vary the inductance of the ground fault neutralizer from time to time so that it will provide on the occurrence of a ground on a phase conductor of the system a lagging current for effectively suppressing the capacitance current to ground at the grounded point regardless of the amount of the system in service.

In such systems it is impractical, in case of faults which the ground fault neutralizer cannot suppress, to secure that selectivity of relay operation which will, in case of such faults, disconnect only the faulty portion of the system and yet maintain continuity of service on sound portions. This is in part due to insufficient fault current to insure the necessary discrimination within the sensitivity limits of the relays. Moreover, when selectivitiy is based on the use of ground fault directional relays, the variation in power factor at any point of the system, in dependence on the location of the fault, even though the power factor may change in sign, is so small that it precludes the use of prearranged relay settings suitable for selective operation regardless of the fault location.

However, if a system is so arranged that one or more of its neutral points may be grounded to accord with a prearrangement of relay settings, then selectivity can be obtained because the factors which militate against the desired relay operation may be eliminated by the grounding of the system. In other words, the system set up, as far as the flow of ground fault current is concerned, is practically that for which prearranged settings within the discriminating ability of the relays are determined since there is usually plenty of fault current with a large power factor variant for different fault locations.

Accordingly, if, after a predetermined time sufficient for the ground fault neutralizer to clear a transient fault, the fault still exists, it is desirable to place the system grounding connections in a condition to correspond with the prearranged selectivity of the ground fault relays so that they may have an opportunity to clear the fault. With this object in mind, as disclosed in Letters Patent 1,378,557, supra, a parallel path to ground is established around all or part of the ground fault neutralizer so that sufficient current may flow to effect the intended relaying operation. Since the criterion for establishing this parallel path around the ground fault neutralizer is the current flow in the neutralizer itself, it may be accomplished by a switch closing operation controlled by means such as a relay responsive to the current flowing in the ground fault neutralizer. The relay is connected to the secondary winding of a current transformer whose primary winding is in series relation with the ground fault neutralizer. However, since the magnitude of the lagging current required to neutralize a ground fault varies widely with the capacitance to ground of the system in service, it is from an economical and practical standpoint unfeasible to provide a relaying means, which will positively pick up and operate satisfactorily at the lowest value of current and not be destroyed by the higher values of current which can occur. Moreover, because of the fallibility of the human element, it is hazardous to rely upon the operating personnel for the necessary changes in the setting of the ground fault neutralizer and also the setting of the current transformer to insure that responsiveness of the relaying means which will effect the necessary cooperation of the elements and avoid danger to the system and also the operating personnel. Moreover, since it is customary to have an ammeter in the secondary circuit of the current transformer, unless the transformer taps are changed in dependence on the change in the ground fault neutralizer, the ammeter would be rendered useless because of off scale and low scale readings.

One object of my invention is to provide an arrangement for simultaneously varying the inductance of an inductive device which is subject to the same voltage for each value of inductance and maintaining the output of a transforming means, having a winding connected in series with the inductive device, within a predetermined range for all the different currents flowing in the inductive device. Another object of my invention is to provide means for varying the inductance of a ground fault neutralizer and simultaneously maintaining within a predetermined range a current derived from the neutralizer current for effecting the response of a control for eliminating the neutralizing effect of the neutralizer. A further object of my invention is to prevent the aforesaid simultaneous actions without first either removing the neutralizer from circuit or establishing a bypass for any current tending to flow in the neutralizer. These and other objects of my invention will hereinafter appear in more detail.

In accordance with my invention, I provide a switching arrangement for an adjustable or tapped inductive device which is arranged to pass a different predetermined current for each value of inductance and a transforming means having a winding in series relation with the device such that, regardless of variation in the inductance of the device, the output of the transforming means is maintained within a predetermined range for all the different currents. Further, in accordance with my invention, I provide a switching arrangement for an adjustable or tapped ground fault neutralizer and current transforming means connected to be energized in accordance with the current in the neutralizer such that, regardless of the amount of the power system in service, the lagging current, which the neutralizer provides in case of a fault to ground on a phase conductor of the system, is sufficient to suppress the capacitance current at the grounded point and the secondary current of the current transformer is maintained within a predetermined range suitable for the operation of electroresponsive means whose function is to eliminate the effect of the neutralizer in the event of a sustained ground fault. Also, in accordance with my invention, I provide means utilizing the ground fault neutralizer bypass circuit or the equivalent to permit the operation of the switching means which varies the inductance of the neutralizer and maintains the output of the transforming means within the predetermined range only when the bypass circuit is first established.

My invention will be better understood from the following description when considered in connection with the accompanying drawing, and its scope will be pointed out in the appended claims.

In the single figure of the accompanying drawing, I have diagrammatically illustrated an embodiment of my invention as applied to an alternating current electric power system shown in part by phase conductors 1, 2 and 3. These may be connected through a line circuit breaker 4 to suitable windings 5, 6 and 7 which may be the windings of a power transformer and which, as shown, are Y connected to provide a neutral point 8. It is to be assumed that the power system is such that, on the occurrence of a ground on any one phase conductor of the system, the capacitance current to ground of the two ungrounded conductors increases substantially. In other words, the system is in effect isolated or at least grounded normally only through one or more arcing ground suppressing devices such as a ground fault neutralizer 9. This is connected and arranged to form a neutral to ground connection having a zero phase sequence inductance such as to provide, on the occurrence of a ground on a phase conductor of the system, a lagging current for effectively suppressing the capacitance current to ground at the grounded point.

In the event of a ground of a permanent character, which the ground fault neutralizer 9 cannot suppress, it is desirable so to ground the system that the ground fault responsive relays, not shown, can control the operation of the system circuit breakers, only one of which is shown, whereby selectively to isolate the fault. For this purpose, there is provided suitable means, such as a grounding switch 10, which is arranged to be closed to render the ground fault neutralizer ineffective after the flow therein of lagging current above a predetermined value for a predetermined time. For this purpose, the switch 10 is arranged through its relatively movable contacts 11 and 12 to complete a circuit to ground from the neutral point 8 in parallel with the ground fault neutralizer 9. As illustrated, the switch 10 is of the latched open electric trip-to-close type under suitable bias as by spring means 13 or gravity or both. The tripping of the latch 14, which holds the movable contact 11 of the switch 10 in the open position, is effected by a trip coil 15 whose circuit includes the normally open contacts 16 of a time delay closing relay 17. The energization of this relay is controlled in response to the current flowing in the ground fault neutralizer 9 by suitable means such as a relay 18 which controls normally closed circuit opening contacts 19 in the circuit of the winding of the relay 17 and normally open circuit closing contacts 20 in the circuit of an alarm or suitable indicating device. For otherwise closing the switch 10, the circuit of the trip coil 15 may include a switch 21 which may be manually or otherwise operated. The circuit of the trip coil may also include an auxiliary b switch 22 movable with the switch contact 11.

Inasmuch as the extent of the power system in service may vary from time to time, the capacitance current to ground of the system, and, therefore, the capacitance current to ground of the ungrounded phase conductors of the system, in case of a fault on one phase conductor, will vary. This necessitates a change in the inductance of the ground fault neutralizer 9 so as to produce the necessary amount of lagging current. Thus, with a large amount of the system in service, there will be a large capacitance current, and this will require a high lagging current or relatively few turns of the neutralizer, whereas with a small amount of the system in service, there will be a small capacitance current requiring only a small lagging current or a large number of turns of the ground fault neutralizer in service. Accordingly, in order to control the number of turns in service, there is provided suitable switching or tap-changing means, such as a movable contact member 23 which, as shown, is arranged to be actuated by a screw shaft 24 to vary the number of turns of the neutralizer connected between the neutral point 8 and ground. Since the relay 18, which effects the closing of the grounding switch 10, must operate in response to the current flowing in the neutralizer, it will be obvious that, if a current transformer is connected in series with the neutralizer 9 and has a fixed number of primary and secondary turns, the secondary output of the current transformer will vary through such a wide range as to make it unfeasible to design a relay which will positively pick up at the smallest value of current the neutralizer passes and which will not be damaged at the largest value of current the neutralizer passes.

If the current transformer secondary is provided with taps so as to control the amount of current supplied to the relay 18, then reliance has to be placed on the operating personnel to be certain that the secondary output is properly changed for each change of the neutralizer. This is not only inconvenient but it also requires too much faith in the human element. Hence, in accordance with my invention, I connect a current transformer 25 with its primary winding 26 in series with the ground fault neutralizer and its secondary winding 27 in circuit with the winding of the relay 18. Further, in accordance with my invention, I arrange to control the output of the current transformer 25 so that the current supplied to the relay 18 is maintained within a predetermined range regardless of the amount of the neutralizer in service. In order that this may be done independently of the human element, I arrange the switching member 23 so that, in changing the number of turns in the ground fault neutralizer, it simultaneously changes the number of turns in the primary winding 26 of the current transformer 25. In other words, I provide an arrangement for simultaneously varying the inductance of the neutralizer and the transformation ratio of the current transformer. Inasmuch as a suitable operating relay 18 can be economically and practically designed to operate satisfactorily on a current range of at least twice its pick up value, it is not necessary for the switch member 23 to change a tap on the current transformer winding 26 every time that a tap is changed on the neutralizer 9. Thus, for example, the current transformer primary winding 26, in the arrangement shown, is provided with three taps 28, 29 and 30 each of which covers a predetermined range of taps of the neutralizer 9 such as to insure a predetermined secondary output within the range of pick up of the relay 18 without destruction thereof by burning or injuring the insulation.

Since it is not economically feasible to design the switching means 23, which operates simultaneously to change the inductance of the neutralizer 9 and to maintain the secondary output of the current transformer 25 within a predetermined range for interrupting the current flowing in the neutral to ground connection, I provide means for preventing a tap-changing operation unless a parallel path to ground is established through the switch 10. Thus, for example, if the screw shaft 24 is driven by an electric motor 31 through suitable gearing 32, then I arrange to prevent the energization of this motor unless the switch 10 is closed. One way in which this may be done is to provide the switch 10 with an auxiliary a switch 33 which is arranged in the circuit of the motor 31 and which is closed only when the switch 10 is closed. The circuit of the motor 31 also includes a control switch 34 which may be manually or otherwise suitably operated.

As shown, the switch 10 can be opened by energizing its opening winding 35 whose circuit is controlled by the contacts 36 of an instantaneous closing time delay opening relay 37. The time delay drop-out may be obtained by a short-circuited winding 38. The circuit of this relay includes a manually or otherwise operated control switch 39 and may also include an a auxiliary switch 40 movable with the contact 10.

Assuming that the portion of the power system in service is such that it requires the positioning of the switch member 23 on the second tap down from the top of the neutralizer 9 in order to provide enough lagging current to compensate the possible high capacitance current to ground in case of a fault on the system. In this case the high lagging current will flow through relatively few turns of the secondary winding 26 of the current transformer 25 and will provide sufficient secondary current to insure the pick up of the relay 18 for controlling the circuit closing operation of the relay 17 and the tripping of the switch 10. However, if the minimum amount of the system is in service, for example, then the switching member 23 will be operated to the bottom tap of the neutralizer 9 and will at the same time engage the tap 30 of the primary winding 26 of transformer 25. In this case, although the minimum current is flowing in the neutralizer, the maximum number of turns are included in the primary winding of the current transformer, and the output of the secondary winding 27 is maintained at a value sufficient to insure the operation of the relay 18 in the event of a ground fault on the system. Whenever the relay 18 is energized to open its contacts and maintain them open sufficiently long for the relay 17 to close its contacts 16, the switch 10 will be closed to bypass the neutralizer 9 and thus establish a ground on the system such as to permit enough ground fault current to flow for the operation of the system ground fault protective relays as they are intended to function in case of a permanent ground which the neutralizer cannot eliminate.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. An alternating current electric system comprising a variable inductance device subject to the same voltage for each value of inductance, transforming means connected to be energized in accordance with the currents flowing in said inductive device, and means for simultaneously varying the inductance of the device and maintaining the output of said transforming means within a predetermined range for each of the currents flowing in said inductive device.

2. An alternating current electric system comprising a variable inductive device subject to the same voltage for each value of inductance, transforming means having a winding connected in series relation with said device, and means for simultaneously varying the inductance of said device and maintaining the output of said transforming means within a predetermined range for each of the currents flowing in said inductive device.

3. In an alternating current electric system having a neutral point and of the type wherein a fault to ground on a phase conductor of the system substantially increases the capacitance current to ground of the ungrounded phase conductors of the system, an inductive connection to ground from said neutral point, means for so varying the inductance of said connection to correspond with the capacitance to ground of the system in service that the zero phase sequence inductance of the connection on the occurrence of a ground on a phase conductor of the system provides a lagging current for effectively suppressing the capacitance current to ground at the grounded point, transforming means connected to be energized in accordance with the lagging current flowing in said connection, and means simultaneously operative with said varying means for maintaining the output of said transforming means within a predetermined range independently of the magnitude of the lagging current in said connection.

4. In an alternating current electric system having a neutral point and of the type wherein a fault to ground on a phase conductor of the system substantially increases the capacitance current to ground of the ungrounded phase conductors of the system, an inductive connection to ground from said neutral point, transforming means having a winding connected in series relation with said connection, and means for so varying the inductance of said connection to correspond with the capacitance to ground of the system in service that the zero phase sequence inductance of the connection on the occurrence of a ground on a phase conductor of the system provides a lagging current for effectively suppressing the capacitance current to ground at the grounded point and for simultaneously maintaining the output of said transforming means within a predetermined range independently of the magnitude of the lagging current in said connection.

5. In an alternating current electric system having a neutral point and of the type wherein a fault to ground on a phase conductor of the system substantially increases the capacitance current to ground of the ungrounded phase conductors of the system, an inductive connection to ground from said neutral point, means for so varying the inductance of said connection to correspond with the capacitance to ground of the system in service that the zero phase sequence inductance of the connection on the occurrence of a ground on a phase conductor of the system provides a lagging current for effectively suppressing the capacitance current to ground at the grounded point, means for completing another connection to ground from said neutral point including transforming means connected to be energized in accordance with the lagging current flowing in said connection, means operative simultaneously with said varying means for maintaining the output of said transforming means within a predetermined range independently of the magnitude of the lagging current in said connection, and relay means connected to be energized in accordance with the output of said transforming means.

6. In an alternating current electric system having a neutral point and of the type wherein a fault to ground on a phase conductor of the system substantially increases the capacitance current to ground of the ungrounded phase conductors of the system, an inductive connection to ground from said neutral point, transforming means having a winding connected in series relation with said connection, means for so varying the inductance of said connection to correspond with the capacitance to ground of the system in service that the zero phase sequence inductance of the connection on the occurrence of a ground on a phase conductor of the system provides a lagging current for effectively suppressing the capacitance current to ground at the grounded point and for simultaneously maintaining the output of said transforming means within a predetermined range independently of the magnitude of the lagging current in said connection, means for establishing a connection to ground in parallel with said inductive connection, and means for preventing the operation of said varying means while said parallel connection is open.

7. An alternating current electric system comprising an inductive device, transforming means connected to be energized in accordance with the current flowing in said inductive device, and switching means for simultaneously varying the inductance of said device and the ratio of transformation of said transforming means.

LEVIN W. FOSTER.